(12) United States Patent
Klintenstedt

(10) Patent No.: US 8,025,443 B2
(45) Date of Patent: Sep. 27, 2011

(54) BEARING DEVICE

(75) Inventor: Kjell Klintenstedt, Saltsjö-Boo (SE)

(73) Assignee: Alfa Laval Corporate AB, Lund (SE)

( * ) Notice: Subject to any disclaimer, the term of this patent is extended or adjusted under 35 U.S.C. 154(b) by 722 days.

(21) Appl. No.: 12/065,353

(22) PCT Filed: Aug. 31, 2005

(86) PCT No.: PCT/SE2005/001258
§ 371 (c)(1),
(2), (4) Date: Jul. 3, 2008

(87) PCT Pub. No.: WO2007/040427
PCT Pub. Date: Apr. 12, 2007

(65) Prior Publication Data
US 2008/0304780 A1    Dec. 11, 2008

(51) Int. Cl.
*F16C 19/00* (2006.01)
*F01M 1/00* (2006.01)
*F01M 11/00* (2006.01)

(52) U.S. Cl. ....... 384/468; 384/472; 384/462; 184/6.17; 184/11.2

(58) Field of Classification Search ............. 384/313, 384/378, 404, 465, 467–468, 471–473, 462; 184/6.18, 6.26, 11.2, 31, 6.17
See application file for complete search history.

(56) References Cited

U.S. PATENT DOCUMENTS

| | | | |
|---|---|---|---|
| 1,378,658 A | * | 5/1921 | Clement et al. ............. 384/472 |
| 1,893,995 A | * | 1/1933 | Jung ............................ 384/101 |
| 2,447,671 A | | 8/1948 | Schuck |
| 2,492,672 A | * | 12/1949 | Wood ........................... 417/372 |
| 2,950,943 A | * | 8/1960 | Forrest ......................... 384/468 |
| 2,961,847 A | * | 11/1960 | Whitney, Jr. et al. ........ 384/313 |
| 4,241,959 A | * | 12/1980 | Frister .......................... 384/472 |
| 4,596,476 A | * | 6/1986 | Schill et al. .................. 384/467 |
| 4,700,808 A | | 10/1987 | Haentjens |
| 5,591,020 A | * | 1/1997 | Rockwood .................. 184/11.2 |
| 5,779,005 A | * | 7/1998 | Jones et al. .................. 184/6.18 |

FOREIGN PATENT DOCUMENTS

| | | | |
|---|---|---|---|
| DE | 3723125 A1 | | 1/1989 |
| EP | 0683351 A1 | | 11/1995 |
| JP | 2001090739 A | * | 4/2001 |
| JP | 2002018676 A | * | 1/2002 |
| JP | 2004162872 A | * | 6/2004 |
| SE | 526437 | | 9/2005 |

OTHER PUBLICATIONS

PCT/SE2005/001258 International Search Report.

* cited by examiner

*Primary Examiner* — Marcus Charles
(74) *Attorney, Agent, or Firm* — Michaud-Kinney Group LLP

(57) ABSTRACT

A bearing device in which an inner ring is sealed from an outer ring by seals and together with the outer ring forms a closed bearing unit with a built-in circulation circuit for a lubricating oil mist. Rolling elements and rolling tracks disposed in the circulation circuit and lubricated by the oil mist. Means are adapted to forming an oil mist of lubricating oil from a reservoir, and means are adapted to causing the oil mist to flow in the circulation circuit. The invention also relates to an application of the bearing device for rotatably supporting a rotor in a centrifugal separator and to a method for supporting a centrifugal separator rotor for rotation about an axis of rotation.

14 Claims, 5 Drawing Sheets

BEARING DEVICE

FIELD OF THE INVENTION

The present invention relates to a bearing device for supporting a shaft which is rotatable about an axis of rotation in a frame. The bearing device comprises a rotatable inner ring connected to the shaft, a non-rotatable outer ring connected to the frame, and at least one row of rolling elements. The rolling elements are disposed in a space formed in the bearing device between the rotatable inner ring and the non-rotatable outer ring, and during operation the row of rolling elements run partly in a first rolling track disposed in a portion of the bearing device which is connected to the inner ring, the latter being rotatable with the shaft, and partly in a second rolling track disposed in a portion of the bearing device which is connected to the non-rotatable outer ring. The bearing device also comprises a reservoir for lubricating oil and means for creating an oil mist of lubricating oil from this reservoir and causing the oil mist to flow axially past and in lubricating contact with the rolling elements and the rolling tracks.

The invention also relates to an application of a bearing device of this kind for rotatably supporting a rotor in a centrifugal separator and to a method for rotatably supporting a rotor in a centrifugal separator by means of a bearing device of this kind.

BACKGROUND OF THE INVENTION

In U.S. Pat. No. 2,447,671 describes a bearing device of this kind is described in which a high-speed ball bearing is lubricated by means of an oil mist. However, the hereby known bearing device is complicated and comprises many parts. Moreover, the aforesaid means in that bearing device for creating an oil mist of lubricating oil from the reservoir and causing the oil mist to flow past and in lubricating contact with the ball bearing takes the form of a impeller disc which rotates with the shaft, extends down into the reservoir and flings oil out into an air flow, thereby causing undesirable heating of the lubricating oil.

The object of the present invention is to provide a simple and compact bearing device in which is disposed a closed lubricating oil system which makes reliable and maintenance-free lubrication during the life of the bearing device possible without unnecessary heating and contamination of the lubricating oil. A particular object of the invention is, to achieve this in a bearing device used for rotatably supporting a rotor in a centrifugal separator and in a method for rotatably supporting a rotor in a centrifugal separator, entailing extra high requirements for the bearing device and its lubrication.

SUMMARY OF THE INVENTION

According to the present invention, this is achieved by the rotatable inner ring of the bearing device being sealed from the non-rotatable outer ring by seals and constituting together with the non-rotatable outer ring a closed bearing unit. In this bearing unit the rolling elements, the first and second rolling tracks, the reservoir for lubricating oil and said means for creating during operation an oil mist comprising lubricating oil drops from this reservoir and means for causing the oil mist to flow axially past and in lubricating contact with the rolling elements and the rolling tracks are disposed. The space in which the rolling elements are disposed constitutes a first flow duct section extending axially from one side of the rolling elements axially past the rolling elements to the axially opposite side of the rolling elements. This flow duct section constitutes together with a second flow duct section, which is formed in the outer ring and is connected to the first flow duct section on both axial sides of the rolling elements, a circulation flow circuit for oil mist during operation, which circulation flow circuit communicates with the inside of the reservoir for lubricating oil.

The axis of rotation is preferably oriented substantially vertically, the reservoir for lubricating oil being situated below the rolling elements.

According to a preferred embodiment of the invention, said means for causing the oil mist to flow past and in lubricating contact with the rolling elements and the rolling tracks comprises an impeller disposed in the space and rotating jointly with the inner ring.

According to another embodiment of the invention, the reservoir is formed in a rotatable element which is connected to the inner ring and which also constitutes an oil guide element which represents said means for creating during operation an oil mist containing lubricating oil drops. The oil guide element has an oil guide surface extending from a portion of the reservoir which is filled with oil during operation to a portion of the circulation circuit, and an edge which is situated adjacent to the circulation circuit, to which edge the oil guide surface extends and guides lubricating oil by centrifugal force. This edge releases lubricating oil drops which are entrained in the oil mist flowing in the circulation circuit.

According to an alternative to that embodiment of a bearing device according to the invention, the reservoir is formed in a non-rotatable element connected to the outer ring, and said means for creating during operation an oil mist containing lubricating oil drops comprises a rotatable mist-generating element connected to the inner ring and extending down into a portion of the reservoir which during operation contains lubricating oil.

According to a particular embodiment of the invention, the first rolling track is disposed in part of the inner ring and the second rolling track is disposed in part of the outer ring. As an alternative to that embodiment of the invention, however, it is also possible according to the present invention for the first rolling track to be disposed in an inner bearing ring connected to the inner ring and for the second rolling track to be disposed in an outer bearing ring connected to the outer ring.

According to a further embodiment of the invention, the bearing device is provided with ducts for a cooling medium.

The object of the method for rotatably supporting a rotor in a centrifugal separator is achieved according to the present invention by the rotatable inner ring being sealed from the non-rotatable outer ring by seals and constituting together with the non-rotatable outer ring a closed bearing unit in which are disposed the rolling elements, the first and second rolling tracks and the reservoir for lubricating oil. During operation, an oil mist containing lubricating oil drops from this reservoir is formed in the bearing unit. In a circulation circuit communicating with the reservoir for lubricating oil, this oil mist is caused to flow past the rolling elements and the rolling tracks, in lubricating contact with them. This circulation circuit comprises partly a first flow duct section taking the form of the space in which the rolling elements are disposed and extending axially from one side of the rolling elements axially past the rolling elements to the axially opposite side of the rolling elements, and partly a second flow duct section formed in the outer ring and connected to the first flow duct section on both axial sides of the rolling elements.

In this case, the axis of rotation is preferably oriented substantially vertically with the reservoir for lubricating oil situated below the rolling elements.

In an embodiment of the method according to the invention, the oil mist is caused to flow past and in lubricating contact with the rolling elements and the rolling tracks by means of an impeller disposed in the space and rotating jointly with the inner ring.

In a particular embodiment of the method according to the invention, the bearing device is cooled by a cooling medium caused to flow in cooling ducts formed in the bearing device.

BRIEF DESCRIPTION OF THE DRAWINGS

Some examples of embodiments of the invention are described in more detail below with reference to the attached drawings, in which.

DETAILED DESCRIPTION OF THE PREFERRED EMBODIMENTS

Figure 1:
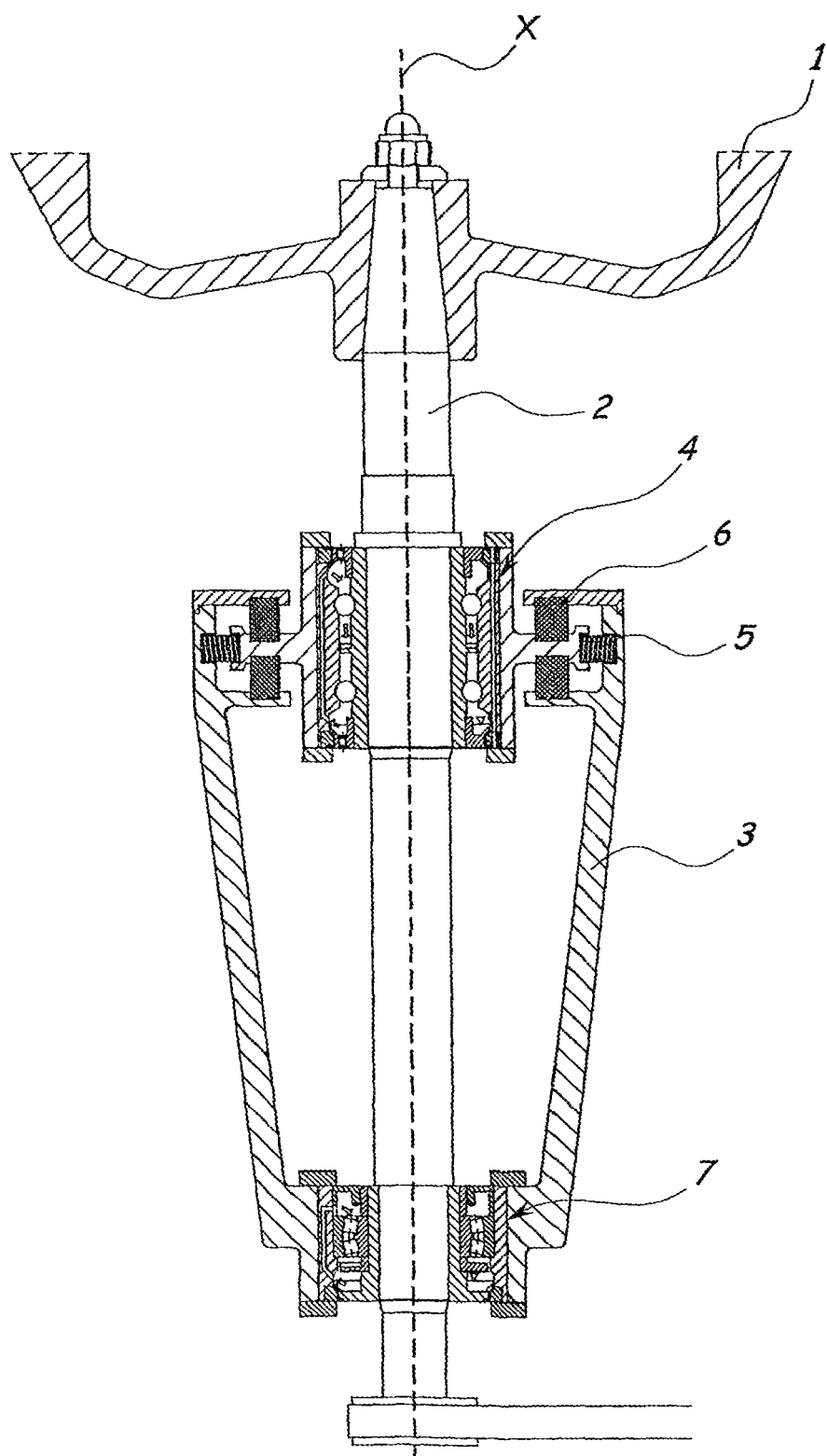
FIG. 1 depicts schematically a cross-section through part of a centrifugal separator in which a bearing device according to the invention is used for supporting a rotor of the centrifugal separator.

The centrifugal separator depicted in FIG. 1 has a rotor 1 mounted on a belt-driven shaft 2. The rotor 1 and the shaft 2 are supported for rotation about a vertical axis of rotation x in a frame 3, partly by an upper bearing device 4 connected firmly to the shaft 2 and connected to the frame 3 via springing elements 5 and vibration damping elements 6, and partly by a lower bearing device 7 connected firmly to the shaft 2 and also connected firmly to the frame 3. Both the upper bearing device 4 and the lower bearing device 7 are configured in accordance with the present invention.

Figure 2:
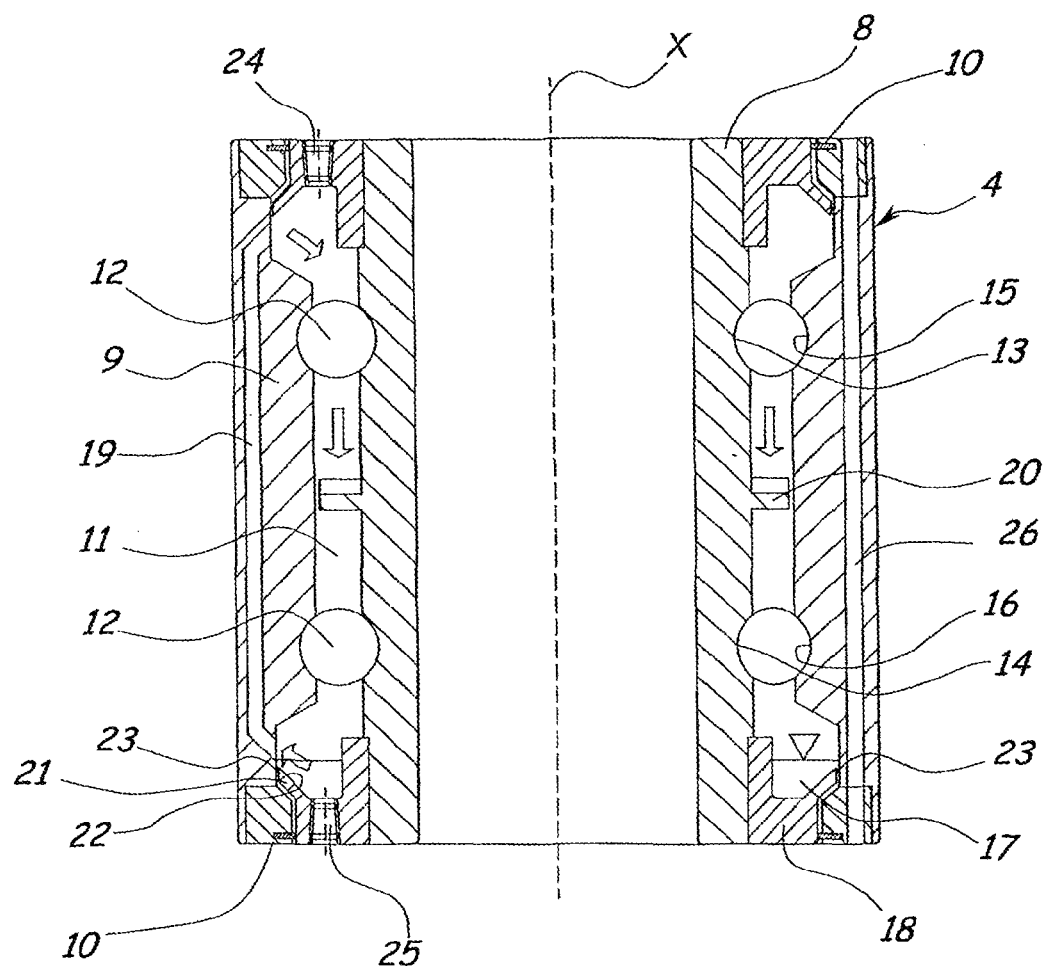
FIG. 2 depicts schematically a cross-section through a bearing device according to an embodiment of the invention.

The upper bearing device 4 depicted in FIG. 1 is shown enlarged in FIG. 2. This bearing device has an inner ring 8 adapted to being connected firmly to a shaft 2 which is rotatable about an axis of rotation x, and an outer ring 9 adapted to being connected to a non-rotatable frame. The inner ring 8 is sealed from the outer ring 9 by seals 10, and two rows of rolling elements in the form of balls 12 are disposed in a space 11 formed between the inner ring 8 and the outer ring 9. Each row of rolling elements 12 is adapted to running partly in the respective rolling track 13 or 14 disposed in the inner ring 8, partly in the respective rolling track 15 or 16 disposed in the outer ring 9. A reservoir 17 for lubricating oil is disposed in the lower portion of the bearing device in an element 18 connected to the rotatable inner ring 8. The space 11 constitutes a first flow duct section and there is in the outer ring 9 a second flow duct section 19 which connects to the first flow duct section 11 on both axial sides of the rolling elements 12. The first flow duct section 11 and the second flow duct section 19 constitute together a circulation flow circuit for circulation of an oil mist. The reservoir 17 for lubricating oil is open to the circulation flow circuit so that the circulation flow circuit communicates with the inside of the reservoir. An impeller 20 connected to the rotatable inner ring 8 is adapted to driving the circulation of the lubricating oil in the circulation circuit.

The element 18 in which the reservoir 17 is formed also constitutes an oil guide element 21 for creating during operation an oil mist containing lubricating oil drops, which oil guide element has an oil guide surface 22 which, from a portion of the reservoir 17 which is filled with oil during operation, extends axially upwards and radially outwards to part of the circulation circuit. The oil guide element 21 also has an edge 23 situated adjacent to the circulation circuit, to which edge 23 the oil guide surface 22 extends and leads lubricating oil by centrifugal force, from which edge 23 lubricating oil drops are released to be entrained in the oil mist flowing in the circulation circuit.

Where necessary, a bearing device according to the present invention may have, as depicted in this embodiment, a threaded hole 24 for adding lubricating oil and a threaded hole 25 for draining lubricating oil. These holes 24 and 25 are preferably provided with undepicted threaded plugs. To make cooling of the bearing device possible, it may, as also depicted in this embodiment, be provided with cooling ducts 26 disposed in the outer ring for a cooling medium.

During operation, the impeller 20 causes the air mixed with lubricating oil which constitutes the oil mist to circulate in the circulation circuit while at the same time lubricating oil in the reservoir 17 is driven by centrifugal force along the oil guide surface 22 to the edge 23 where lubricating oil drops join the oil mist flowing in the circulation circuit and travel on into the second flow duct section 19. Part of the lubricating oil creeps in a lubricating oil film along the radial outer wall surface of the second flow duct section 19 and is driven further by the oil mist flow. Oil drops from the lubricating oil film also join the oil mist. From the second flow duct section 19, the oil mist flows across to the first flow duct section 11 and passes and lubricates the rolling elements 12 and the rolling tracks 13, 14, 15 and 16. Part of the lubricating oil is deposited on the wall surfaces of the first flow duct section 11 and runs back down into the reservoir 17 while the rest of the lubricating oil remains in the circulating oil mist.

Figure 3:
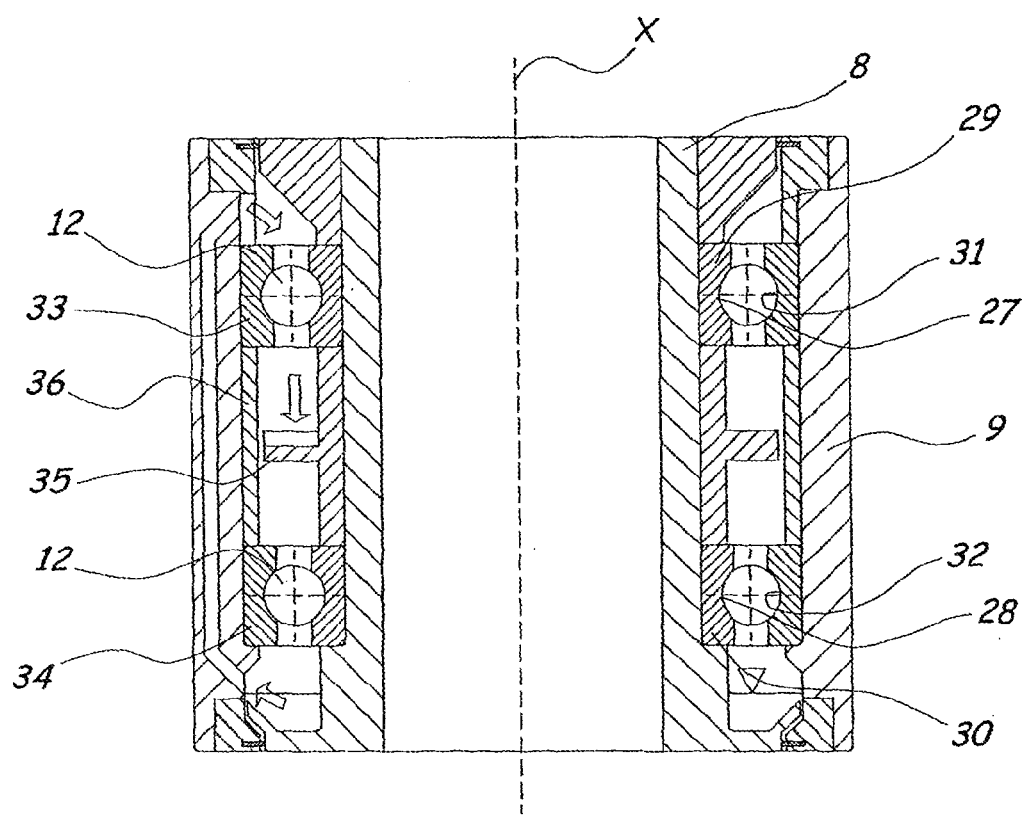
FIG. 3 depicts schematically a cross-section through a bearing device according to another embodiment of the invention.

FIG. 3 depicts another embodiment of a bearing device according to the invention which differs from the embodiment depicted in FIG. 2 in that each row of rolling elements 12 is adapted to running partly in the respective rolling track 27 or 28 disposed in their respective inner bearing rings 29 and 30 connected to the inner ring 8, and partly in their respective rolling track 31 or 32 disposed in the respective outer bearing ring 33 or 34 connected to the outer ring 9. In this embodiment, the impeller 35 takes the form of a separate element connected to the inner ring 8 and at the same time serves as a spacing element between the two inner bearing rings 29 and 30. The two outer bearing rings 33 and 34 are retained axially by a spacing ring 36. In other respects the embodiment according to FIG. 3 corresponds to the embodiment according to FIG. 2.

Figure 4:
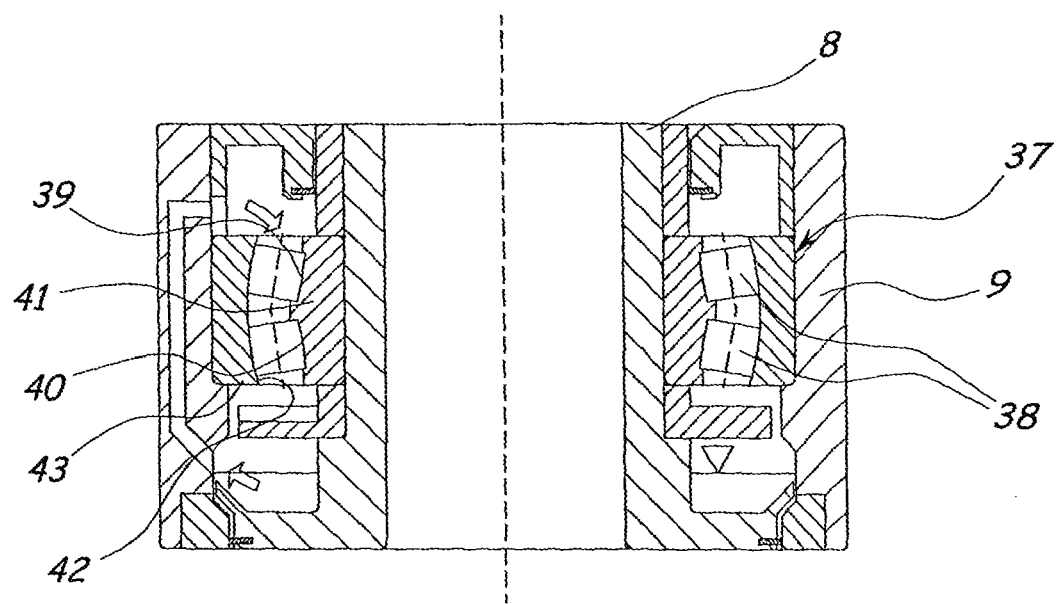
FIG. 4 depicts schematically a further embodiment of the invention which is an enlargement of the embodiment depicted in FIG. 1 as the lower bearing device 7.

FIG. 4 depicts a third embodiment of a bearing device which differs from the embodiment depicted in FIG. 3 in that the rolling elements of the inner and outer bearing rings are replaced by a conventional spherical rolling bearing 37 with rolling elements in the form of two rows of rollers 38 running partly in rolling tracks 39 and 40 in an inner bearing ring 41 connected to the inner ring 8, and partly in a spherical rolling track 42 in an outer bearing ring 43 firmly connected to an outer ring 9.

Figure 5:
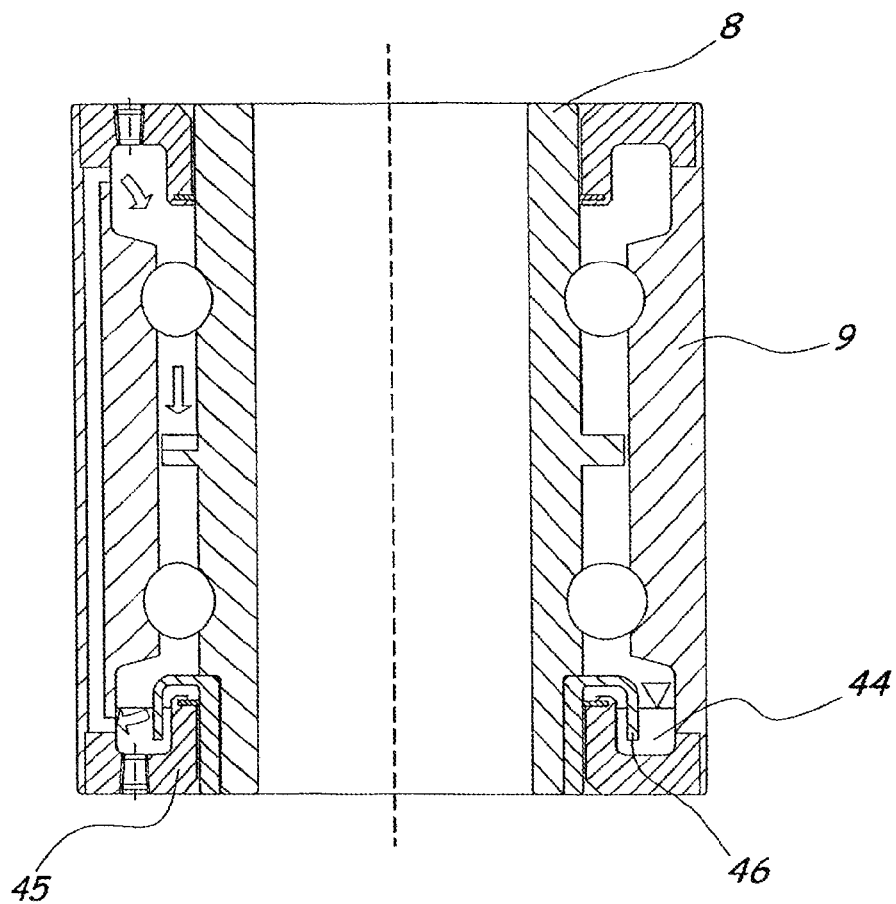
FIG. 5 depicts schematically a cross-section through a bearing device according to a fourth embodiment of the invention.

In all the embodiments of the invention depicted in FIGS. 1, 2, 3 and 4, the reservoirs 17 are formed in an element 18 connected to the rotatable inner ring 8. An alternative embodiment is depicted in FIG. 5, in which the reservoir 44 is formed in a non-rotatable element 45 which is connected to the outer ring 9, and said means for creating during operation an oil mist containing lubricating oil drops comprises a rotatable mist-generating element 46 connected to the inner ring 8 and extending down into a portion of the reservoir 44 which during operation contains lubricating oil.

During operation of this bearing device, the rotating mist-generating element 46 moves lubricating oil drops up out of the non-rotatable reservoir 44, which lubricating oil drops join the oil mist flow in the circulation circuit. In other respects the bearing device according to this embodiment functions in the same way as the embodiment of the invention depicted in FIG. 2.

The amount of oil in the oil mist has to be properly adapted to the lubrication requirement. Too great an amount might cause harmful heating of the bearing device. The flow of oil mist which the impeller causes in contact with the lubricating oil in the reservoir 17 or 44 may in some cases be sufficient to form an oil mist which contains enough oil.

To ensure that oil will at start-up reach the rolling elements, the inner ring 8 may be provided with a small extra reservoir situated in the circulation circuit upstream from the rolling elements (above in the embodiments depicted). This extra reservoir will accumulate a small amount of lubricating oil when the shaft stops and will at start-up empty the lubricating oil into the circulation circuit by centrifugal force.

By using a bearing device in this manner according to the present invention for rotatably supporting a rotor in a centrifugal separator the need is eliminated for any lubrication system outside the bearing devices. Instead, the lubrication of the bearing device is reliably taken care of internally in the closed bearing unit of the simple and compact bearing device, which is sealed from the environment, without unnecessary heating and contamination of the lubricating oil.

In the embodiment example depicted, the centrifugal separator has a belt-driven rotor but may of course also be engine-driven via a worm gear or be driven directly. The rotor need not be rotatable about a vertical axis but may also be rotatable about a horizontal axis, as in a settling tank.

What is claimed is:

1. A bearing device for supporting a shaft, which is rotatable about an axis of rotation (x) in a frame, whereby the bearing device comprises:
    a rotatable inner ring connected to the shaft, a non- rotatable outer ring connected to the frame, and at least one row of rolling elements which are disposed in a space formed in the bearing device between the rotatable inner ring and the non- rotatable outer ring, and whereby during operation the row of rolling elements is adapted to running partly in a first rolling track disposed in an element of the bearing device which is connected to the inner ring, the latter being rotatable with the shaft, and partly in a second rolling track disposed in an element of the bearing device which is connected to the non-rotatable outer ring, which bearing device also comprises a reservoir for lubricating oil and means for creating an oil mist from the lubricating oil from this reservoir and means for causing the oil mist to flow past and in lubricating contact with the rolling elements and the rolling tracks,
    the rotatable inner ring being sealed from the non-rotatable outer ring by seals and forming together with the non-rotatable outer ring a closed bearing unit in which are disposed the rolling elements, the first rolling track, the second rolling track, the reservoir for lubricating oil, said means for creating during operation the oil mist from the lubricating oil drops from this reservoir, means for causing the oil mist to flow axially past and in lubricating contact with the rolling elements and the rolling tracks, and
    the space in which the rolling elements are disposed constitutes a first flow duct section which extends axially from one side of the rolling elements axially past the rolling elements to the axially opposite side of the rolling elements, and which, together with a second flow duct section formed in the outer ring and connected to the first flow duct section on both axial sides of the rolling elements, constitutes a circulation flow circuit for oil mist during operation, which circulation flow circuit communicates with the inside of the reservoir for lubricating oil.

2. A bearing device according to claim 1, wherein the axis of rotation (x) is oriented substantially vertically.

3. A bearing device according to claim 2, wherein the reservoir for lubricating oil is situated below the rolling elements.

4. A bearing device according to claim 1, wherein said means for causing the oil mist to flow past and in lubricating contact with the rolling elements and the rolling tracks comprises an impeller disposed in the space and rotating jointly with the inner ring.

5. A bearing device according to claim 4, wherein the reservoir also constitutes an oil guide element which represents said means for creating during operation an oil mist containing lubricating oil drops and has an oil guide surface extending from a portion of the reservoir which is filled with oil during operation to part of the circulation circuit, said oil guide element having an edge situated adjacent to the circulation circuit, to which edge the oil guide surface extends and leads lubricating oil by centrifugal force, from which edge lubricating oil drops are released to be entrained in the oil mist flowing in the circulation circuit.

6. A bearing device according to claim 4, wherein said means for creating during operation an oil mist containing lubricating oil drops comprises a rotatable mist-generating element connected to the inner ring and extending down into a portion of the reservoir which during operation contains lubricating oil.

7. A bearing device according to claim 1, wherein the element in which said first rolling track is disposed is an inner bearing ring, and the element in which said second rolling track is disposed is an outer bearing ring.

8. A bearing device according to claim 1, wherein the bearing device is provided with ducts for a cooling medium.

9. A application of a bearing device according to claim 1, wherein the bearing device is adapted to rotatably support a rotor in a centrifugal separator.

10. A method for supporting the rotor of a centrifugal separator for rotation about an axis of rotation (x) on a shaft supported in a frame, said method comprising providing a bearing device which comprises an inner ring connected to the shaft, an outer ring connected to the frame, and at least one row of rolling elements which are disposed in a space formed in the bearing device between the rotatable inner ring and the non-rotatable outer ring and which, during operation, run partly in a first rolling track disposed in an element of the bearing device which is connected to the inner ring and is rotatable with the shaft, and partly in a second rolling track disposed in a non-rotatable element of the bearing device which is connected to the outer ring, causing lubricating oil from a reservoir in the bearing device to form an oil mist which is caused to flow axially past and to lubricate the rolling elements and the rolling tracks in that the rotating inner ring is sealed from the non-rotatable outer ring by seals and constitutes together with the non-rotatable outer ring a closed bearing unit in which the rolling elements, the first rolling track, the second rolling track, the reservoir for lubricating oil are disposed and in which, during operation, the oil mist containing lubricating oil drops from this reservoir is formed and the oil mist formed is caused to flow axially past and to lubricate the rolling elements and the rolling tracks, whereby during operation the oil mist is caused to flow in a circulation circuit communicating with the reservoir for lubricating oil and comprising partly a first flow duct section which constitutes the space in which the rolling elements are disposed and which extends axially from one side of the rolling elements axially past the rolling elements to the axially opposite side of the rolling elements, and partly a second flow duct section formed in the outer ring and connected to the first flow duct section on both axial sides of the rolling elements.

11. A method according to claim 10, wherein the axis of rotation (x) is oriented substantially vertically with the reservoir for lubricating oil situated below the rolling elements.

12. A method according to either of claim 10, wherein the oil mist is caused to flow past and in lubricating contact with the rolling elements and the rolling tracks by an impeller disposed in the space and rotating jointly with the inner ring.

13. A method according to claim 10, wherein the bearing device is cooled by a cooling medium caused to flow in cooling ducts formed in the bearing device.

14. A bearing device for supporting a shaft, which is rotatable about an axis of rotation (x) in a frame, whereby the bearing device comprising:

a rotatable inner ring connected to the shaft, a non- rotatable outer ring connected to the frame, and at least one row of rolling elements which are disposed in a space formed in the bearing device between the rotatable inner ring and the non- rotatable outer ring, and whereby during operation the row of rolling elements is adapted to running partly in a first rolling track disposed in the inner ring, and partly in a second rolling track disposed in the outer ring, which bearing device also comprises a reservoir for lubricating oil and means for creating an oil mist from the lubricating oil from this reservoir and means for causing the oil mist to flow past and in lubricating contact with the rolling elements and the rolling tracks, the rotatable inner ring being sealed from the non-rotatable outer ring by seals and forming together with the non-rotatable outer ring a closed bearing unit in which are disposed the rolling elements, the first rolling track, the second rolling track, the reservoir for lubricating oil, said means for creating during operation the oil mist from the lubricating oil drops from this reservoir, means for causing the oil mist to flow axially past and in lubricating contact with the rolling elements and the rolling tracks, and the space in which the rolling elements are disposed constitutes a first flow duct section which extends axially from one side of the rolling elements axially past the rolling elements to the axially opposite side of the rolling elements, and which, together with a second flow duct section formed in the outer ring and connected to the first flow duct section on both axial sides of the rolling elements, constitutes a circulation flow circuit for oil mist during operation, which circulation flow circuit communicates with the inside of the reservoir for lubricating oil.

* * * * *